(No Model.)

G. R. DUVAL.
TRACTION WHEEL.

No. 450,484. Patented Apr. 14, 1891.

Witnesses:

Inventor,
George R. Duval
By Dewey & Co.
Attys

UNITED STATES PATENT OFFICE.

GEORGE R. DUVAL, OF BENICIA, CALIFORNIA, ASSIGNOR TO THE BENICIA AGRICULTURAL WORKS, OF SAME PLACE.

TRACTION-WHEEL.

SPECIFICATION forming part of Letters Patent No. 450,484, dated April 14, 1891.

Application filed February 4, 1891. Serial No. 380,195. (No model.)

*To all whom it may concern:*

Be it known that I, GEORGE R. DUVAL, a citizen of the United States, residing at Benicia, Solano county, State of California, have invented an Improvement in Traction-Engine Wheels; and I hereby declare the following to be a full, clear, and exact description of the same.

My invention relates to certain improvements in the construction of metallic wheels, and it is especially applicable to wheels of large size, such as are employed for traction-engines and through which power is transmitted to propel the engine over the ground and haul loads or agricultural machinery.

It consists in certain details of construction which will be more fully explained by reference to the accompanying drawings, in which—

Figure 1:
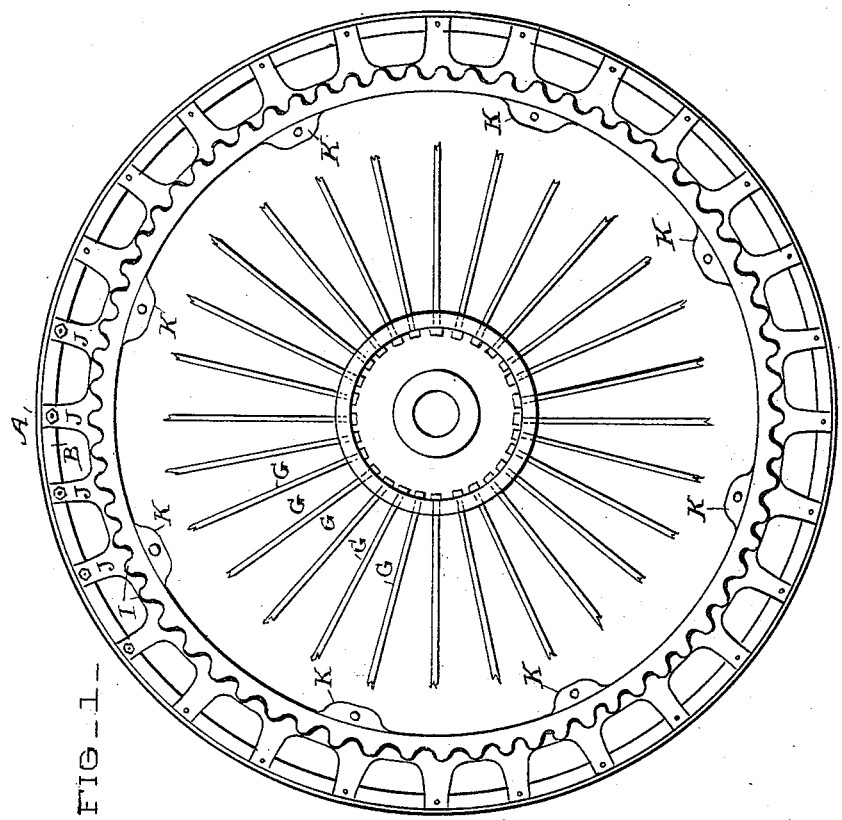
Figure 2:
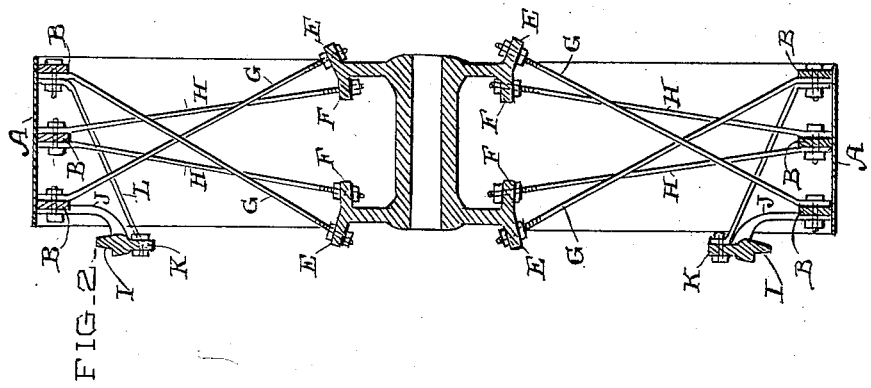

Figure 1 is a side elevation of my wheel, showing the attachment and sprocket or chain-driving wheel. Fig. 2 is a transverse section taken through the plane of the axis.

In the construction of wheels of this class, which are intended to support heavy weights, and which often traverse rough and stony roads, it is important to construct the wheel in such a manner as to make it exceedingly rigid and capable of resisting torsional strains and such strains as arise from the swaying of the engine which causes an end-motion in the direction of the axis, and also to so construct the wheel-rims as to give them sufficient rigidity to prevent their being bent and indented without making them extraordinarily heavy and unwieldy.

My present drawings are taken from a machine in actual use, the wheels of which are ten and one-half feet in diameter.

A is the tire or rim of a wheel, which is made of heavy boiler-iron or sheet-steel, and B B are flanges or fellies, one of which is fitted around the outer edge upon each side of the wheel. These fellies are made of iron or steel and of sufficient strength and rigidity to resist any tendency to bend or indent the rim of the wheel. As many of these fellies may be introduced between the two outside ones as the width of the face of the wheel requires. In the present case I have shown a single central one, and the rim is riveted to these fellies.

C is the hub of the wheel, which is fitted to the shaft or axle in any suitable manner, so as to either turn with the shaft or, as in the present case, to turn loosely upon it.

D are disks projecting radially from each side of the hub and having the outwardly and inwardly turned flanges E and F, with holes made through them at suitable angles to receive the spokes which connect them with the wheel-rim. The spokes G pass through the outer flanges E, and, crossing each other, are bolted to the inner sides of the exterior fellies B. The spokes H pass through the inner flanges F and extend outwardly, converging to the central felly B, to which they are bolted, the spokes thus crossing each other in such a manner as to brace the wheel and make it very rigid to resist end-thrusts. The inner ends of the spokes G and H are screw-threaded, and locking-nuts are fitted upon these screw-threads outside and inside of the hub-flanges through which they pass, and by means of these nuts the hub is accurately centered in the wheel, the proper tension is brought upon the spokes, and they are locked in place so that they will not become loose.

In order to apply power to drive this wheel, I have shown a chain driving or sprocket wheel I. This wheel is preferably made in sections and has a diameter smaller than the diameter of the main wheel.

From the sprocket-wheel sections stout arms J extend a short distance inwardly from the side and then turn outwardly and extend to the rim of the wheel. These arms have holes made through them, and the bolts which pass through the outer ends of the spokes G upon that side pass through these sprocket-wheel arms, and thus secure them strongly to the felly of the wheel. If preferred, the sprocket-wheel arms may be bolted to the felly independently of the wheel-spokes; but by bolting them at the same points the number of holes and bolts will be diminished. Lugs or extensions K project from the inner periphery of the sprocket-wheel sections, and have holes made through them which serve for the passage of bolts, these bolts passing through the ends of braces L, which are thus strongly united to the sprocket-wheel sections at as many points as may be desired. These braces L extend across the wheel inside of the fellies B, and are bolted to the outer felly upon the side opposite to which the sprocket-wheel is attached. By this construction a sprocket-wheel of any diameter may be attached to the main wheel and supported at a sufficient distance from its side to insure the free travel of the driving-chain without contact with the wheel-rim, and by reason of the diagonal braces L the sprocket-wheel is rendered as strong and rigid as it is possible to make.

Having thus described my invention, what I claim as new, and desire to secure by Letters Patent, is—

1. In a wheel, the outer rim or tire, a series of fellies fitted around the interior of said rim, bolts by which the rim is secured to the fellies, a central hub having exterior and interior flanges, and spokes passing through the exterior flanges, crossing each other to the opposite exterior fellies of the wheel, other spokes passing through the interior flanges and converging to the interior felly or fellies of the wheel, and nuts by which the tension and adjustment are regulated, substantially as herein described.

2. In a wheel, the exterior rim, a series of fellies to which said rim is bolted, spokes having the outer ends bolted to said fellies, crossing each other and having their inner ends connected with flanges of a central wheel-hub, and a second series of spokes bolted to the central fellies of the wheel and diverging to the interior flanges of the wheel-hub, and lock-nuts fitting the screw-threaded inner ends of said spokes outside and inside of the hub-flanges, substantially as herein described.

3. The wheel consisting of the outer rim with fellies, a flanged hub, and spokes connecting the hub and fellies, as shown, in combination with a sprocket-wheel having the outwardly-extending arms J bolted to the wheel-felly upon one side, substantially as herein described.

4. The wheel having the outer rim, fellies to which said rim is bolted, a central hub with flanges and diagonally-disposed spokes connecting the hub-flanges and rim-fellies, as shown, in combination with the sprocket-wheel sections, having the curved outwardly-extending arms J, and bolts by which said arms are secured to the wheel-felly upon one side, and diagonal braces L, extending from the sprocket-wheel across the interior of the main wheel, and bolts by which said braces are united to the outer felly of the wheel, substantially as herein described.

In witness whereof I have hereunto set my hand.

GEORGE R. DUVAL.

Witnesses:
T. B. MONTGOMERY,
J. F. CLYNE.